US010208807B2

(12) United States Patent
Miyagawa et al.

(10) Patent No.: US 10,208,807 B2
(45) Date of Patent: Feb. 19, 2019

(54) TORQUE-LIMITING DEVICE FOR VEHICLE

(71) Applicants: Takeshi Miyagawa, Toyokawa (JP); Satoru Takahashi, Nisshin (JP)

(72) Inventors: Takeshi Miyagawa, Toyokawa (JP); Satoru Takahashi, Nisshin (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 524 days.

(21) Appl. No.: 15/047,321

(22) Filed: Feb. 18, 2016

(65) Prior Publication Data

US 2016/0160933 A1 Jun. 9, 2016

Related U.S. Application Data

(60) Division of application No. 14/099,390, filed on Dec. 6, 2013, which is a continuation of application No. PCT/JP2011/062962, filed on Jun. 6, 2011.

(51) Int. Cl.
F16D 7/02 (2006.01)
F16F 15/129 (2006.01)
B60K 6/365 (2007.10)
B60K 6/445 (2007.10)

(52) U.S. Cl.
CPC .......... *F16D 7/025* (2013.01); *F16F 15/1297* (2013.01); *B60K 6/365* (2013.01); *B60K 6/445* (2013.01)

(58) Field of Classification Search
CPC .............................. F16D 7/025; F16F 15/1297
USPC .......... 464/45, 46, 47, 48, 68.4, 68.41, 68.7, 464/68.8; 192/107 R, 214.1
See application file for complete search history.

(56) References Cited

U.S. PATENT DOCUMENTS 3,775,998 A 12/1973 Century et al.
5,154,683 A 10/1992 Phelps
2005/0067249 A1 3/2005 Nakagaito et al.
(Continued)

FOREIGN PATENT DOCUMENTS

EP 2 233 779 9/2010
JP 2005-127507 5/2005
(Continued)

OTHER PUBLICATIONS

International Search Report dated Aug. 30, 2011 in PCT/JP2011/062962, filed Jun. 6, 2011 (with English translation).
(Continued)

*Primary Examiner* — Matthieu F Setliff
(74) *Attorney, Agent, or Firm* — Oblon, McClelland, Maier & Neustadt, L.L.P.

(57) ABSTRACT

Since a friction force generated on friction surfaces between a pressure plate and a first friction material is smaller than a friction force generated on friction surfaces between a lining plate and the first friction material, when a torque is input to a damper device, a slip first occurs between the pressure plate and the first friction material, and the lining plate and the first friction material integrally rotate. In this case, a hysteresis torque is generated based on the friction force between the pressure plate and the first friction material. Since a torque limiter mechanism also acts as a hysteresis mechanism in this way, a torque limiter mechanism is realized that can generate the hysteresis torque with a simple structure.

4 Claims, 8 Drawing Sheets

(56) References Cited

U.S. PATENT DOCUMENTS

| | | | |
|---|---|---|---|
| 2007/0155513 A1 | 7/2007 | Nakagaito et al. | |
| 2007/0191120 A1 | 8/2007 | Saeki et al. | |
| 2010/0224459 A1 | 9/2010 | Saeki et al. | |
| 2010/0248846 A1 | 9/2010 | Saeki et al. | |
| 2011/0098119 A1* | 4/2011 | Saeki | F16F 15/129 464/42 |
| 2012/0115620 A1* | 5/2012 | Iwama | F16D 7/027 464/46 |

FOREIGN PATENT DOCUMENTS

| | | | |
|---|---|---|---|
| JP | 2007-218347 | | 8/2007 |
| JP | 2008-304008 | | 12/2008 |
| JP | 2010-223401 | | 10/2010 |
| JP | 2010-230162 | | 10/2010 |
| JP | 2010-236629 | | 10/2010 |
| JP | 2010223294 A | * | 10/2010 |
| JP | 2016070323 A | * | 5/2016 |

OTHER PUBLICATIONS

Written Opinion of International Search Authority in PCT/JP2011/062962, filed Jun. 6, 2011 (with English translation).

* cited by examiner

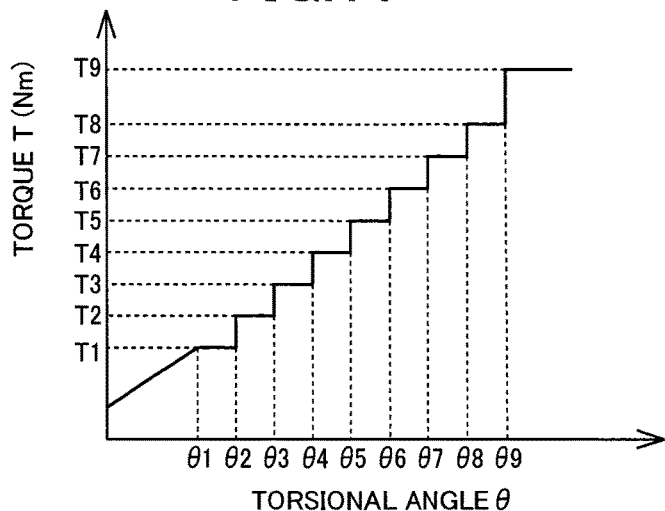
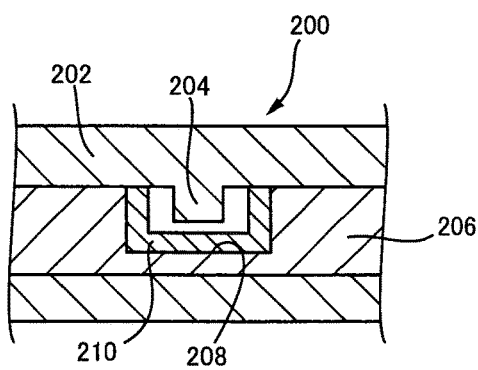
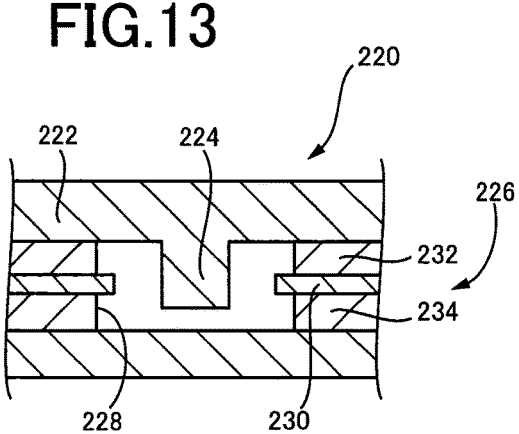

TORQUE-LIMITING DEVICE FOR VEHICLE

CROSS-REFERENCE TO RELATED APPLICATIONS

This application is a divisional of and claims the benefit of priority from U.S. Ser. No. 14/099,390, filed Dec. 6, 2013, the entire contents of which is incorporated herein by reference. U.S. Ser. No. 14/099,390 is a continuation-in-part of PCT/JP2011/062962, filed Jun. 6, 2011.

TECHNICAL FIELD

The present invention relates to a vehicle torque limiter device and particularly to a structure of a torque limiter device enabling acquisition of a hysteresis torque with a simple structure.

BACKGROUND ART

A vehicle torque limiter device is known that has a cover plate rotatable around an axial center, a lining plate relatively rotatable to the cover plate around the same axial center, a friction material interposed between the cover plate and the lining plate, and a pressing member for generating a pressing force between the cover plate and the lining plate. For example, a torque fluctuation absorber of Patent Document 1 is an example thereof.

A torque fluctuation absorber 1 described in Patent Document 1 has a damper mechanism 20 including a side plate 22 rotatable around an axial center, a hub 21 relatively rotatable to the side plate 22 around the same axial center, and a damper member 24 elastically coupling the side plate 22 and the hub 21, and a limiter portion 30 (torque limiter device) disposed on the outer circumferential side of the damper mechanism 20. The torque fluctuation absorber 1 is disposed with a hysteresis mechanism (thrust member, disc spring 23c) generating a single stage hysteresis torque between the hub 21 and the side plate 22 with the limiter portion 30 disposed on the outer circumferential side thereof. A torque fluctuation absorber 1 described in Patent Document 2 is disposed with a hysteresis mechanism (a first hysteresis mechanism and a second hysteresis mechanism) generating two-stage hysteresis torques between a hub 21 and a first and second side plates 22A and 22B.

PRIOR ART DOCUMENT

Patent Document

Patent Document 1: Japanese Laid-Open Patent Publication No. 2005-127507
Patent Document 2: Japanese Laid-Open Patent Publication No. 2007-218347
Patent Document 3: Japanese Laid-Open Patent Publication No. 2010-230162

SUMMARY OF THE INVENTION

Problems to be Solved by the Invention

Since both the hysteresis mechanism of Patent Document 1 and the hysteresis mechanism of Patent Document 2 are disposed between the hub and the side plate 22, the hysteresis mechanisms are disposed on the inner circumferential side. Therefore, an operation radius (rotation radius) of the hysteresis mechanisms is reduced, which problematically reduces a hysteresis torque that can be generated in the hysteresis mechanisms. In Patent Document 1, the hysteresis mechanism and the limiter portion 30 (torque limiter device) are separately disposed. In Patent Document 2, even when the torque limiter device is disposed, the hysteresis mechanism and the torque limiter device are separately disposed as is the case with Patent Document 1. Each of these hysteresis mechanism and torque limiter devices includes a friction material, a disc spring, etc., and since the hysteresis mechanism and the torque limiter device are separately disposed in the references 1 and 2, it is problematic that a structure becomes highly complicated.

The present invention was conceived in view of the situations and it is therefore an object of the present invention to provide a vehicle torque limiter device enabling acquisition of a hysteresis torque with a simple structure.

Means for Solving the Problem

To achieve the object, the first aspect of the invention provides (a) a vehicle torque limiter device comprising: a cover plate rotatable around an axial center; a lining plate relatively rotatable to the cover plate around the same axial center; a friction material interposed between the cover plate and the lining plate; and a pressing member for generating a pressing force between the cover plate and the lining plate, (b) the cover plate and the friction material being configured to be slidable on each other, (c) the lining plate and the friction material being configured to be slidable on each other, (d) a friction force generated on friction surfaces between the cover plate and the friction material being smaller than a friction force generated on friction surfaces between the lining plate and the friction material, (e) a stopper being disposed between the cover plate and the friction material, the stopper defining a slip amount between the cover plate and the friction material.

Effects of the Invention

Consequently, since the friction force generated on the friction surfaces between the cover plate and the friction material is smaller than the friction force generated on the friction surfaces between the lining plate and the friction material, when a torque is input to the torque limiter device, a slip first occurs between the cover plate and the friction material, and the lining plate and the friction material integrally rotate. In this case, a hysteresis torque is generated based on the friction force between the cover plate and the friction material. In other words, the cover plate and the friction material making up the torque limiter device act as a hysteresis mechanism. When the slip amount between the cover plate and the friction material reaches a defined value, the stopper is actuated and the slip between the cover plate and the friction material is inhibited. As a result, the torque limiter device acts as a normal torque limiter based on the friction force generated on the friction surfaces between the lining plate and the friction material. Since the torque limiter device is also used as the hysteresis mechanism in this way, the torque limiter device is realized that can generate the hysteresis torque with a simple structure. When the torque limiter device is disposed closer to the outer circumference, the operation radius of the torque limiter device is increased and, therefore, even a large hysteresis torque can be realized.

Preferably, (a) the cover plate includes a pair of a first cover plate and a second cover plate, (b) a first friction material is interposed as the friction material between the first cover plate and the lining plate, (c) a second friction material is also interposed as the friction material between the second cover plate and the lining plate, (d) a first stopper is disposed as the stopper between the first cover plate and the first friction material, (e) a second stopper is disposed as the stopper between the second cover plate and the second friction material, (f) a slip amount defined by the first stopper is smaller than a slip amount defined by the second stopper, (g) a friction force generated on friction surfaces between the first cover plate and the first friction material and a friction force generated on friction surfaces between the second cover plate and the second friction material are smaller than a friction force generated on friction surfaces between the lining plate and the first friction material, and (h) a friction force generated on friction surfaces between the lining plate and the first friction material is smaller than a friction force generated on friction surfaces between the lining plate and the second friction material.

Consequently, when the torque is input to the torque limiter device, a slip first occurs on the friction surfaces between the first cover plate and the first friction material and the friction surfaces between the second cover plate and the second friction material, and a first hysteresis torque is generated at this point. When the first stopper is locked, a slip occurs between the lining plate and the first friction material and a second hysteresis torque is generated at this point. When the second stopper is locked, the torque limiter device acts as a normal torque limiter based on the friction force generated between the lining plate and the second friction material. In this way, the torque limiter device can be realized that enables acquisition of two-stage hysteresis torques.

Preferably, (a) a vehicle torque limiter device comprising: a cover plate rotatable around an axial center; a lining plate relatively rotatable to the cover plate around the same axial center; a friction material interposed between the cover plate and the lining plate; and a pressing member for generating a pressing force between the cover plate and the lining plate, (b) the cover plate and the friction material being configured to be slidable on each other, (c) the lining plate and the friction material being configured to be slidable on each other, (d) friction surfaces between the cover plate and the friction material slipping earlier than friction surfaces between the lining plate and the friction material when a torque is input to the torque limiter portion, (e) a stopper being disposed between the cover plate and the friction material, the stopper defining a slip amount between the cover plate and the friction material.

Consequently, when the torque is input to the torque limiter device, a slip first occurs between the cover plate and the friction material, and the lining plate and the friction material integrally rotate. In this case, the hysteresis torque is generated based on the friction force between the cover plate and the friction material. In other words, the cover plate and the friction material making up the torque limiter device act as the hysteresis mechanism. When the slip amount between the cover plate and the friction material reaches the defined value, the stopper is actuated and the slip between the cover plate and the friction material is inhibited. As a result, the torque limiter device acts as a normal torque limiter based on the friction force generated on the friction surfaces between the lining plate and the friction material. Since the torque limiter device is also used as the hysteresis mechanism in this way, the torque limiter device is realized that can generate the hysteresis torque with a simple structure. When the torque limiter device is disposed closer to the outer circumference than conventional hysteresis mechanisms, the operation radius of the torque limiter device is increased and, therefore, a large hysteresis torque can be acquired.

Preferably, (a) the cover plate includes a pair of a first cover plate and a second cover plate, (b) a first friction material is interposed as the friction material between the first cover plate and the lining plate, (c) a second friction material is also interposed as the friction material between the second cover plate and the lining plate, (d) a first stopper is disposed as the stopper between the first cover plate and the first friction material, (e) a second stopper is disposed as the stopper between the second cover plate and the second friction material, (f) a slip amount defined by the first stopper is smaller than a slip amount defined by the second stopper, and (g) when a torque is input to the torque limiter portion, a slip first occurs on friction surfaces between the first cover plate and the first friction material and friction surfaces between the second cover plate and the second friction material, then occurs on friction surfaces between the lining plate and the first friction material, and lastly occurs on friction surfaces between the lining plate and the second friction material. Consequently, when the torque is input to the torque limiter device, a slip first occurs on the friction surfaces between the first cover plate and the first friction material and the friction surfaces between the second cover plate and the second friction material, and a first hysteresis torque is generated at this point. When the first stopper is locked, a slip occurs between the lining plate and the first friction material and a second hysteresis torque is generated at this point. When the second stopper is locked, the torque limiter portion acts as a normal torque limiter based on the friction force generated between the lining plate and the second friction material. In this way, the torque limiter device can be realized that enables acquisition of two-stage hysteresis torques.

Preferably, the torque limiter device comprises (a) a plurality of the first friction materials arranged separately in a circumferential direction, (b) a plurality of the first stoppers defining a slip amount between a plurality of the first friction materials and the first cover plate, (c) a plurality of the second friction materials arranged separately in a circumferential direction, and (d) a plurality of the second stoppers defining a slip amount between a plurality of the second friction materials and the second cover plate, wherein (e) a friction coefficient between the plurality of the first friction materials and the lining plate is different from a friction coefficient between the plurality of the second friction materials and the lining plate each other, and wherein for the friction material having the friction surface with the larger friction coefficient between the friction material and the lining plate, the slip amount defined by the first stopper or the second stopper is set larger. Consequently, by differentiating the friction coefficients from each other on the friction surfaces of the plurality of the first friction materials and the plurality of the second friction materials and the lining plate, the torque limiter device can be implemented that enables acquisition of multistage hysteresis torque.

BRIEF DESCRIPTION OF THE DRAWINGS

FIG. 11 is a diagram of relationship between a torque transmitted to the damper device of FIG. 8 and a torsional angle.

FIG. 12 is a diagram of other form of stoppers.

FIG. 13 is a diagram of further other form of stoppers.

MODE FOR CARRYING OUT THE INVENTION

An example of the present invention will now be described in detail with reference to the drawings. In the following example, the figures are simplified or deformed as needed and portions are not necessarily precisely depicted in terms of dimension ratio, shape, etc.

First Example

Figure 1:
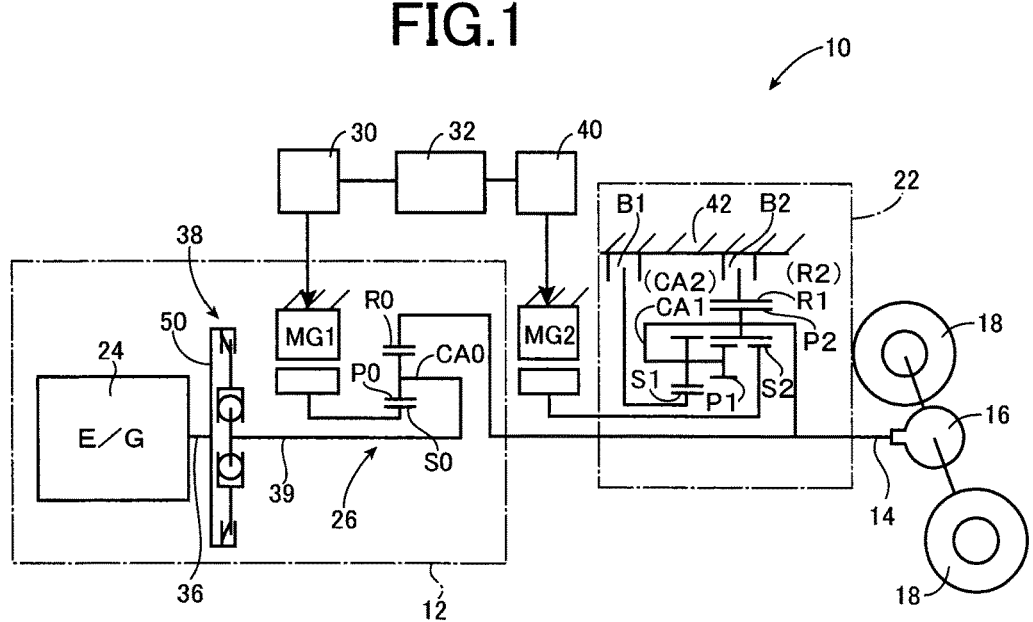
FIG. 1 is a general configuration diagram for explaining a hybrid type vehicle drive device to which the present invention is applied.

FIG. 1 is a general configuration diagram for explaining a hybrid type vehicle drive device 10 to which the present invention is applied. In FIG. 1, the vehicle drive device 10 transmits a torque of a first drive source 12, i.e., a main drive source, to a wheel-side output shaft 14 acting as an output member in a vehicle such that the torque is transmitted from the wheel-side output shaft 14 via a differential gear device 16 to a pair of left and right drive wheels 18. The vehicle drive device 10 is disposed with a second electric motor MG2 capable of selectively providing power running control for outputting drive power for running and regenerative control for recovering energy as a second drive source and the second electric motor MG2 is coupled via an automatic transmission 22 to the wheel-side output shaft. Therefore, an output torque transmitted from the second electric motor MG2 to the wheel-side output shaft is increased and decreased depending on a gear ratio γs (=rotation speed Nmg2 of the second electric motor MG2/rotation speed Nout of the wheel-side output shaft) set by the automatic transmission 22.

The automatic transmission 22 interposed in a power transmission path between the second electric motor MG2 and the drive wheels 18 is configured such that a plurality of stages having the gear ratio γs greater than "1" can be established; at the time of power running when a torque is output from the second electric motor MG2, the torque can be increased and transmitted to the wheel-side output shaft; and, therefore, the second electric motor MG2 is configured with a lower capacity or in a smaller size. As a result, for example, if the rotation speed Nout of the wheel-side output shaft is increased in association with a higher vehicle speed, the gear ratio γs is made smaller to reduce the rotation speed (hereinafter referred to as a second electric motor rotation speed) Nmg2 of the second electric motor MG2 so as to maintain the operation efficiency of the second electric motor MG2 in a favorable state, or if the rotation speed Nout of the wheel-side output shaft is reduced, the gear ratio γs is made larger to increase the second electric motor rotation speed Nmg2.

The first drive source 12 is mainly made up of an engine 24 acting as a main power source, a first electric motor MG1, and a planetary gear device 26 acting as a power distribution mechanism for combining or distributing torque between the engine 24 and the first electric motor MG1. The engine 24 is a known internal combustion engine combusting fuel to output power, such as a gasoline engine and a diesel engine, and is configured to have an operational state, such as a throttle valve opening degree and an intake air amount, a fuel supply amount, and an ignition timing, electrically controlled by an engine-control electronic control device (E-ECU) not depicted mainly made up of a microcomputer. The electronic control device is supplied with detection signals from an accelerator operation amount sensor AS detecting an operation amount of an accelerator pedal, a brake sensor BS for detecting the presence of operation of a brake pedal, etc.

The first electric motor MG1 is, for example, a synchronous electric motor, configured to selectively fulfill a function as an electric motor generating a drive torque and a function as an electric generator, and is connected via an inverter 30 to an electric storage device 32 such as a battery and a capacitor. The inverter 30 is controlled by a motor-generator-control electronic control device (MG-ECU) not depicted mainly made up of a microcomputer, thereby adjusting or setting the output torque or a regenerative torque of the first electric motor MG1.

The planetary gear device 26 is a single pinion type planetary gear mechanism including a sun gear S0, a ring gear R0 disposed concentrically to the sun gear S0, and a carrier CA0 supporting a pinion gear P0 meshing with the sun gear S0 and the ring gear R0 in a rotatable and revolvable manner as three rotating elements to generate a known differential action. The planetary gear device 26 is disposed concentrically to the engine 24 and the automatic transmission 22. Since the planetary gear device 26 and the automatic transmission 22 are symmetrically configured relative to a center line, the lower halves thereof are not depicted in FIG. 1.

In this example, a crankshaft 36 of the engine 24 is coupled via a damper device 38 and a power transmission shaft 39 to the carrier CA0 of the planetary gear device 26. On the other hand, the sun gear S0 is coupled to the first electric motor MG1, and the ring gear R0 is coupled to the wheel-side output shaft. The carrier CA0, the sun gear S0, and the ring gear R0 act as an input element, a reaction force element, and an output element, respectively.

If a reaction torque from the first electric motor MG1 is input to the sun gear S0 for an output torque of the engine 24 input to the carrier CA0 in the planetary gear device 26, a direct torque occurs in the ring gear R0 that is the output element and, therefore, the first electric motor MG1 acts as an electric generator. When the rotation speed of the ring gear R0, i.e., the rotation speed (output shaft rotation speed)

Nout of the wheel-side output shaft 14 is constant, a rotation speed (engine rotation speed) Ne of the engine 24 can continuously be changed by changing a rotation speed Nmg1 of the first electric motor MG1 higher and lower.

The automatic transmission 22 of this example is made up of a set of Ravigneaux type planetary gear mechanisms. In other words, the automatic transmission 22 is disposed with a first sun gear S1 and a second sun gear S2; a larger diameter portion of a stepped pinion P1 meshes with the first sun gear S1; a smaller diameter portion of the stepped pinion P1 meshes with a pinion P2; and the pinion P2 meshes with a ring gear R1 (R2) disposed concentrically to the sun gears S1 and S2. The pinions P1 and P2 are held by a common carrier CA1 (CA2) in a rotatable and revolvable manner. The second sun gear S2 meshes with the pinion P2.

The second electric motor MG2 is controlled via an inverter 40 by the motor-generator-control electronic control device (MG-ECU) to act as an electric motor or an electric generator and an assist output torque or a regenerative torque is adjusted or set. The second sun gear S2 is coupled to the second electric motor MG2 and the carrier CA1 is coupled to the wheel-side output shaft. The first sun gear S1 and the ring gear R1 make up a mechanism corresponding to a double pinion type planetary gear device along with the pinions P1 and P2, and the second sun gear S2 and the ring gear R1 make up a mechanism corresponding to a single pinion type planetary gear device along with the pinion P2.

The automatic transmission 22 is disposed with a first brake B1 disposed between the first sun gear S1 and a housing 42 that is a non-rotating member for selectively fixing the first sun gear S1, and a second brake B2 disposed between the ring gear R1 and the housing 42 for selectively fixing the ring gear R1. The brakes B1, B2 are so-called friction engagement devices using a frictional force to generate a braking force and are implemented by employing multi-plate type engagement devices or band-type engagement devices. The brakes B1, B2 are configured such that torque capacities thereof are respectively continuously changed depending on engagement pressures generated by a hydraulic actuator for the brake B1 and a hydraulic actuator for the brake b2 such as hydraulic cylinders.

The automatic transmission 22 configured as described above is configured such that the second sun gear S2 acts as an input element, that the carrier CA1 acts as an output element, that a high-speed stage H is established with a gear ratio γsh greater than "1" when the first brake B1 is engaged, and that a low-speed stage L is established with a gear ratio γsl greater than the gear ratio γsh of the high-speed stage H when the second brake B2 is engaged instead of the first brake B1. In other words, the automatic transmission 22 is a two-speed transmission in which a shift between the gear stages H and L is performed based on a running state such as a vehicle speed V and a required drive power (or an accelerator operation amount). More specifically, shift stage ranges are determined in advance as a map (shift diagram) and control is provided such that one of the shift stages is set depending on a detected operational state.

Figure 2:
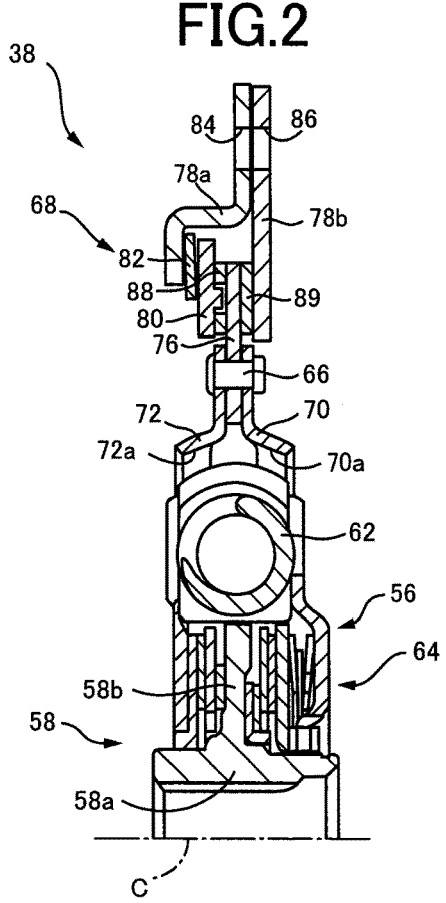
FIG. 2 is a cross-sectional view for explaining a configuration of the damper device depicted in FIG. 1 in detail.

FIG. 2 is a cross-sectional view for explaining a configuration of the damper device 38 depicted in FIG. 1 in detail. The lower half of the damper device 38 from an axial center C is not depicted in FIG. 2. The damper device 38 is disposed around the axial center C between the engine 24 and the planetary gear device 26 in a power transmittable manner. The power transmission shaft 39 depicted in FIG. 1 is spline-fitted to an inner circumferential portion of the damper device 38.

The damper device 38 includes a pair of left and right disc plates 56 rotatable around the axial center C, a hub member 58 relatively non-rotatably coupled to the power transmission shaft 39 by spline fitting and disposed relatively rotatably to the disc plates 56 around the same axial center, coil springs 62 (torsion springs) made of spring steel interposed between the disc plates 56 and the hub member 58 to operatively (elastically) couple the disc plates 56 and the hub member 58 while elastically deforming depending on a relative rotation amount between the members, a hysteresis mechanism 64 generating a friction force between the disc plates 56 and the hub member 58, and the torque limiter mechanism 68 disposed on the outer circumferential side of the disc plates 56. The torque limiter mechanism 68 corresponds to a vehicle torque limiter device of the present invention.

The disc plates 56 are made up of a pair of disc-shaped first and second plates 70 and 72 on the right and left and are relatively non-rotatably fixed by a rivet 66 with the coil springs 62 axially sandwiched by the plates 70 and 72. The rivet 66 also acts as a fastening member of a lining plate 76 of the torque limiter mechanism 68 described later. The first plate 70 has a plurality of first opening holes 70a formed in a circumferential direction for housing the coil springs 62. The second plate 72 has a plurality of second opening holes 72a formed in the circumferential direction at positions corresponding to the first opening holes 70a for housing the coil springs 62. A plurality of the coil springs 62 is housed in spaces formed by the first opening holes 70a and the second opening holes 72a. As a result, when the disc plates 56 rotate around the axial center C, the coil springs 62 are revolved around the axial center C in the same way.

The hub member 58 is formed from a cylindrical portion 58a including inner circumferential teeth spline-fitted to the power transmission shaft 39 in an inner circumferential portion and circular-plate-shaped flange portions 58b radially extending outward from an outer circumferential surface of the cylindrical portion 58a. The coil springs 62 are housed in spaces formed between the flange portions 58b in the rotation direction. As a result, when the hub member 58 rotates around the axial center C, one ends of the coil springs 62 abut on the hub member 58 and, therefore, the coil springs 62 are revolved around the axial center C in the same way. With such a configuration, the coil springs 62 operatively couple the disc plates 56 and the hub member 58 while elastically deforming depending on a relative rotation amount between the members. For example, when the disc plates 56 rotate, one ends of the coil springs 62 are pressed and the other ends of the coil springs 62 press the flange portions 58b of the hub member 58, thereby rotating the hub member 58. In this case, since the coil springs 62 transmit the rotation while being elastically deformed, a shock due to torque variation is absorbed by the elastic deformation of the coil springs 62.

The hysteresis mechanism 64 is disposed on the inner circumferential side of the coil springs 62 and between the disc plates 56 and the flange portions 58b of the hub member 58 in an axial direction. The hysteresis mechanism 64 is made up of a plurality of friction materials, a disc spring, etc., and generates a friction force between the disc plates 56 and the hub member 58. Optimum hysteresis torque is set by adjusting this friction force. The hysteresis mechanism 64 of this example includes a friction engagement element made of a friction material with a low friction coefficient and a friction engagement element made of a friction material with a high friction coefficient to generate two-stage hysteresis torques.

The torque limiter mechanism 68 (the torque limiter device of the present invention) is disposed on the outer circumferential side of the disc plates 56 and has a function of preventing torque transmission exceeding a preset limit torque Tlim. The torque limiter mechanism 68 includes the annular-plate-shaped lining plate 76 fastened by the rivet 66 along with the disc plates 56 to integrally rotate around the axial center C with the disc plates 56, a support plate 78 consisting of a disc-shaped first support plate 78a and a circular-plate-shaped second support plate 78b located on the outer circumferential side, a circular-plate-shaped pressure plate 80 disposed adjacently to the lining plate 76 to be housed in the support plate 78, a cone-shaped disc spring 82 interposed in a preloaded state in a gap between the pressure plate 80 and the first support plate 78a in the axial direction, a first friction material 88 (friction material) interposed between the pressure plate 80 and the lining plate 76, and a second friction material 89 interposed between an inner circumferential portion of the second support plate 78b and the lining plate 76. The pressure plate 80 corresponds to a cover plate of the present invention.

Figure 3:
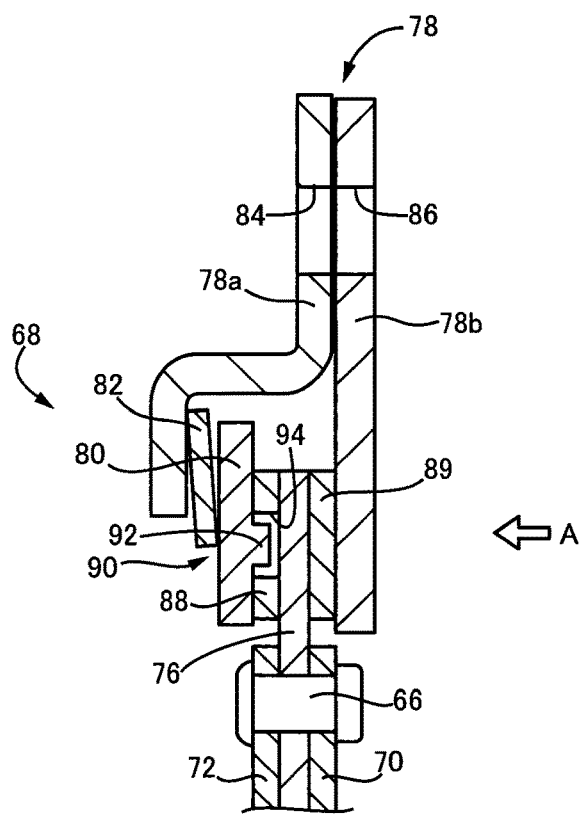
FIG. 3 is a partially enlarged cross-sectional view of the torque limiter mechanism of FIG. 2.

FIG. 3 is a partially enlarged cross-sectional view of the torque limiter mechanism 68 of FIG. 2. Description will hereinafter be made with reference to FIG. 3. The support plate 78 is made up of a pair of the disc-shaped first support plate 78a and the circular-plate-shaped second support plate 78b on the left and right having outer circumferential portions disposed with bolt holes 84 and 86, respectively, for bolt-fastening not depicted fixing a flywheel 50 of FIG. 1 and the support plates 78a and 78b.

The first support plate 78a has an inner circumferential portion bent in the axial direction to form a space between the first support plate 78a and the second support plate 78b. This space houses the disc spring 82, the pressure plate 80, the first friction material 88, the lining plate 76, and the second friction material 89 in this order from the first support plate 78a toward the second support plate 78b in the axial direction.

The lining plate 76 is an annular-plate-shaped member fixed by the rivet 66 along with the first plate 70 and the second plate 72. The pressure plate 80 is also formed into an annular plate shape. The pressure plate 80 and the lining plate 76 are configured to be relatively rotatable around the same axial center C. The first friction material 88 is interposed between the pressure plate 80 and the lining plate 76. The first friction material 88 is formed into an annular plate shape, for example. Alternatively, the first friction materials 88 may be formed into an arc shape and arranged at regular angular intervals side-by-side in the circumferential direction.

In the first friction material 88, a friction surface on the side adjacent to the pressure plate 80 is configured to be slidable on the pressure plate 80. A friction surface of the first friction material 88 adjacent to the lining plate 76 is configured to be slidable on the lining plate 76. Therefore, the first friction material 88 is fixed by neither the adjacent pressure plate 80 nor the lining plate 76.

A friction coefficient $\mu 1$ of the friction surfaces (sliding surfaces) between the pressure plate 80 and the first friction material 88 is made smaller than a friction coefficient $\mu 2$ of the friction surfaces (sliding surfaces) between the lining plate 76 and the first friction material 88. Therefore, a friction force F1 generated on the friction surfaces between the pressure plate 80 and the first friction material 88 is smaller than a friction force F2 generated on the friction surfaces between the lining plate 76 and the first friction material 88.

A stopper 90 is disposed between the pressure plate 80 and the first friction material 88 to define an upper limit value of a slip amount (relative rotation amount) between the pressure plate 80 and the first friction material 88. The stopper 90 is made up of a column-shaped projection 92 axially projecting from the friction surface of the pressure plate 80 adjacent to the first friction material 88, and a circular stopper hole 94 formed in the first friction material 88. The projection 92 is housed in the stopper hole 94 and has a backlash (gap) in the circumferential direction (rotation direction) for defining a predetermined slip amount (relative rotation) between the pressure plate 80 and the first friction material 88.

Figure 4:
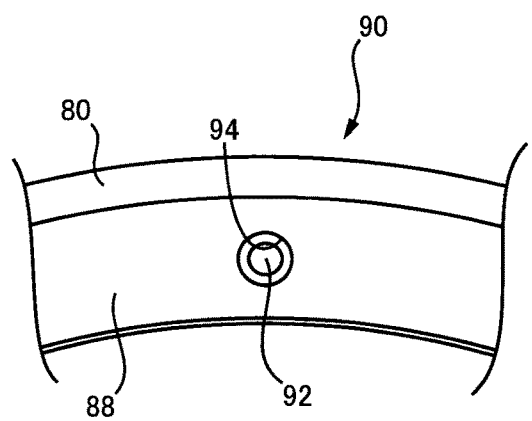
FIG. 4 is an arrow view of the pressure plate and the first friction material viewed from arrow A in FIG. 3.

FIG. 4 is an arrow view of the pressure plate 80 and the first friction material 88 viewed from arrow A in FIG. 3. As depicted in FIG. 3, the stopper hole 94 is formed into a perfectly circular hole larger than the diameter of the projection 92. As a result, the backlash is formed between the projection 92 and the stopper hole 94 and a slip in the rotation direction is allowed between the pressure plate 80 and the first friction material 88 by the backlash. Therefore, when a slip amount between the pressure plate 80 and the first friction material 88 reaches a defined value, the projection 92 abuts on the wall surface of the stopper hole 94, making the pressure plate 80 and the first friction material 88 relatively non-rotatable.

The second friction material 89 is interposed between the inner circumferential portion of the second support plate 78b and the lining plate 76. The second friction material is formed into, for example, an annular plate shape, as is the case with the first friction material 88. Alternatively, the second friction materials 89 may be formed into an arc shape and arranged at regular angular intervals side-by-side in the circumferential direction.

In the second friction material 89, a friction surface on the side adjacent to the second support plate 78b is configured to be slidable on the second support plate 78b and a friction surface adjacent to the lining plate 76 is configured to be slidable on the lining plate 76. Therefore, the second friction material 89 is fixed by neither the adjacent second support plate 78b nor the lining plate 76. The friction coefficient $\mu$ is set to the friction coefficient $\mu 2$ on both the friction surfaces (sliding surfaces) between the second support plate 78b and the second friction material 89 and the friction surfaces (sliding surfaces) between the lining plate 76 and the second friction material 89.

The disc spring 82 is interposed in the preloaded state between the first support plate 78a and the pressure plate 80. The disc spring 82 is formed into a cone shape with an inner circumferential end portion thereof abutting on the pressure plate 80 and an outer circumferential end portion abutting on the first support plate 78a and is deformed and interposed to have a deflection amount generating the preload (disc spring load W). Therefore, the disc spring 82 axially presses the pressure plate 80 toward the lining plate 76 by the disc spring load W. As a result, a friction force F is generated between the pressure plate 80 and the first friction material 88, between the lining plate 76 and the first friction material 88, between the second support plate 78b and the second friction material 89, and the lining plate 76 and the second friction material 89. The disc spring 82 corresponds to a pressing member of the present invention.

Figure 5:
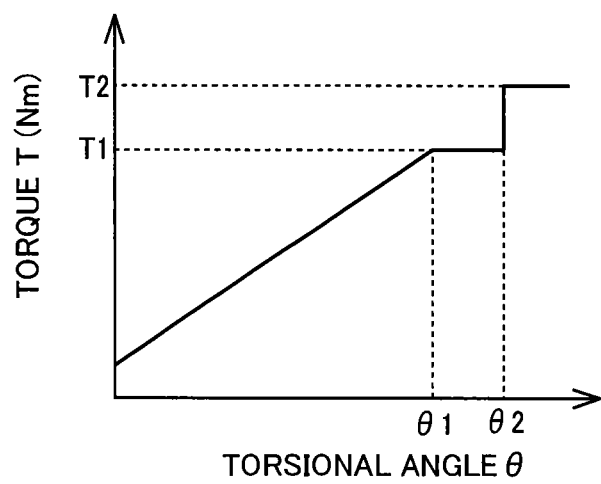
FIG. 5 is a diagram of relationship between a torque transmitted to the damper device of FIG. 2 and a torsional angle.

An operation of the damper device 38 configured as described above will be described. FIG. 5 depicts relationship between a torque T input to the damper device 38 and a torsional angle θ of the damper device 38. The horizontal axis indicates the torsional angle θ and the vertical axis indicates the torque T. When the torque T is input to the damper device 38 and the torsional angle θ increases to a torsional angle θ1, a slip first occurs on the friction surfaces between the pressure plate 80 and the first friction material 88 having the lower friction coefficient μ1, and a hysteresis torque T1 is generated at this point. The hysteresis torque T1 in this case is represented by the following Equation (1). In Equation (1), r1 denotes an operation radius (rotation radius) of the first friction material 80 and W denotes the disc spring load of the disc spring 82.

$$T1 = r1 \times \mu1 \times W \quad (1)$$

When the torsional angle θ reaches θ2, the slip amount allowed by the stopper 90 reaches the defined value. In this case, the projection 92 abuts on the stopper hole 94 in the stopper 90, making the pressure plate 80 and the first friction material 88 relatively non-rotatable. Therefore, the slip is regulated between the pressure plate 80 and the first friction material 88. A slip then occurs on the friction surfaces between the lining plate 76 and the first friction material 88. A torque T2 generated in this case is represented by the following Equation (2). Since the friction coefficient μ2 is larger than the friction coefficient μ1, the torque T2 becomes larger than the torque T1 (T2>T1). The torque T2 is a limit torque Tlm of the torque limiter mechanism 68.

$$T2 = r1 \times \mu2 \times W \quad (2)$$

As a result, the single stage hysteresis torque T1 is realized in the torque limiter mechanism 68. The torque limiter mechanism 68 is disposed closer to the outer circumference than the disc plates 56, the operation radius (rotation radius) r1 of the first friction material 88 is made larger. Therefore, since a wide range of hysteresis torque from small hysteresis torque to large hysteresis torque can be acquired by adjusting the friction coefficient μ1 and the disc spring load W of the disc spring 82, a degree of freedom of design is significantly improved. Since the torque limiter mechanism 68 also acts as the hysteresis mechanism, i.e., the torque limiter mechanism 68 is also used as the hysteresis mechanism, the torque limiter mechanism 68 is realized that can generate the hysteresis torque with a simple structure.

Since conventional hysteresis mechanisms are disposed on the inner circumferential portion of the damper device, a large hysteresis torque is difficult to acquire. To acquire a large hysteresis torque in the conventional hysteresis mechanisms, it is required to use high friction coefficient material and increase a pushing load of the disc spring; however, since high friction coefficient material has poor abrasion resistance, if the pushing load of the disc spring is increased, peripheral components receive a larger reaction force and, therefore, the strength of these components must be raised. Thus, a large hysteresis torque is difficult to acquire.

On the other hand, since the torque limiter mechanism 68 is disposed with the hysteresis torque mechanism in this example, the operation radius (rotation radius) of the friction material increases and even a large hysteresis torque can easily be realized. For example, it is conventionally difficult to attenuate a resonance or engine start torque, which is input equal to or greater than the engine maximum torque, with hysteresis torque. In this regard, since a hysteresis torque exceeding the engine maximum torque can be generated in this example, the attenuation with hysteresis torque can be achieved at the time of resonance or engine start.

As described above, according to this example, since the friction force F1 generated on the friction surfaces between the pressure plate 80 and the first friction material 88 is smaller than a friction force F2 generated on the friction surfaces between the lining plate 76 and the first friction material 88, when the torque T is input to the damper device 38, a slip first occurs between the pressure plate 80 and the first friction material 88, and the lining plate 76 and the first friction material 88 integrally rotate. In this case, the hysteresis torque T1 is generated based on the friction force between the pressure plate 80 and the first friction material 80. In other words, the pressure plate 80 and the first friction material 88 making up the torque limiter mechanism 68 act as the hysteresis mechanism. When the slip amount between the pressure plate 80 and the first friction material 88 reaches the defined value, the stopper 90 is actuated and the slip between the pressure plate 80 and the first friction material 88 is inhibited. As a result, the torque limiter mechanism 68 acts as a normal torque limiter based on the friction force generated on the friction surfaces between the lining plate 76 and the first friction material 88. Since the torque limiter mechanism 68 is also used as the hysteresis mechanism in this way, the torque limiter mechanism 68 is realized that can generate the hysteresis torque with a simple structure. Since the torque limiter mechanism 68 is disposed closer to the outer circumference than the disc plates 56, the operation radius (rotation radius) of the torque limiter mechanism 68 is increased and even a large hysteresis torque can be realized. By using low friction material etc., a small hysteresis torque can also easily be acquired. This configuration can easily be achieved without adding the number of components.

According to this example, since this configuration can simply be achieved by differentiating the friction coefficients of the both surfaces of the friction material, forming the stopper hole 94 in the friction material, and forming the projection 92 on the pressure plate 80 in a conventional configuration, a wide range of hysteresis torque can be generated without making a significant design change.

Since the two-stage hysteresis mechanism 64 is included in this example, three-stage hysteresis torques can be realized by adding the hysteresis of the torque limiter mechanism 64.

Other examples of the present invention will be described. In the following description, the portions common with the example are denoted by the same reference numerals and will not be described.

Second Example

Figure 6:
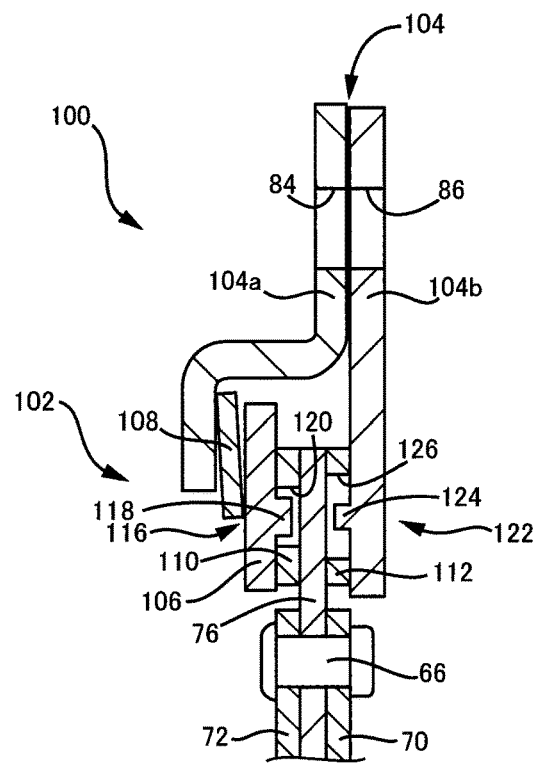
FIG. 6 is a cross-sectional view for explaining a structure of a torque limiter mechanism in a damper device that is another example of the present invention.

FIG. 6 is a cross-sectional view for explaining a structure of a torque limiter mechanism 102 included in a damper device 100 that is another example of the present invention, corresponding to FIG. 3 in the example. A support plate 104 is made up of a pair of a disc-shaped first support plate 104a and a circular-plate-shaped second support plate 104b on the left and right. The first support plate 104a has an inner circumferential portion bent in the axial direction to form a space between the first support plate 104a and the second support plate 104b. This space houses a disc spring 108, a pressure plate 106, a first friction material 110, the lining plate 76, and a second friction material 112 from the first support plate 104a toward the second support plate 104b. The torque limiter mechanism 102 corresponds to the vehicle torque limiter device of the present invention; the first friction material 110 corresponds to a first friction material of the present invention; the second friction material 112 corresponds to a second friction material of the present invention; the pressure plate 106 corresponds to a first cover plate of the present invention; the second support plate 104b corresponds to a second cover plate of the present invention; and the disc spring 108 corresponds to the pressing member of the present invention.

The pressure plate 106 and the second support plate 104b are rotatably disposed around the axial center C and the lining plate 76 is relatively rotatable to the pressure plate 106 and the second support plate 104b around the axial center C.

The first friction material 110 is interposed between the pressure plate 106 and the lining plate 76. In the first friction material 110, a friction surface on the side adjacent to the pressure plate 106 is configured to be slidable on the pressure plate 106 and a friction surface adjacent to the lining plate 76 is configured to be slidable on the lining plate 76. Therefore, the first friction material 110 is fixed by neither the pressure plate 106 nor the lining plate 76.

A friction coefficient μ1 of the friction surfaces (sliding surfaces) between the pressure plate 106 and the first friction material 110 is made smaller than a friction coefficient μ2 of the friction surfaces (sliding surfaces) between the lining plate 76 and the first friction material 110. Therefore, a friction force F1 generated between the pressure plate 106 and the first friction material 110 is smaller than a friction material F2 generated between the lining plate 76 and the first friction material 110.

A first stopper 116 (first stopper) is disposed between the pressure plate 106 and the first friction material 110 to define a maximum amount of a slip amount (relative rotation amount) between the pressure plate 106 and the first friction material 110. The first stopper 116 is made up of a column-shaped projection 118 axially projecting from the friction surface of the pressure plate 106 adjacent to the first friction material 110, and a perfectly circular stopper hole 120 formed in the first friction material 110. The projection 118 is housed in the stopper hole 120 to form a backlash L1 (gap) in the circumferential direction (rotation direction) for defining the slip amount (relative rotation) between the pressure plate 106 and the first friction material 110.

The second friction material 112 is formed between the inner circumferential portion of the second support plate 104b and the lining plate 76. In the second friction material 112, a friction surface on the side adjacent to the second support plate 104b is configured to be slidable on the second support plate 104b and a friction surface adjacent to the lining plate 76 is configured to be slidable on the lining plate 76. Therefore, the second friction material 112 is fixed by neither the second support plate 104b nor the lining plate 76.

The friction surfaces (sliding surfaces) between the second support plate 104b and the second friction material 112 are set to the friction coefficient μ1. In other words, the friction coefficient is made equal to the friction coefficient μ1 of the friction surfaces (sliding surfaces) between the pressure plate 106 and the first friction material 110. A friction coefficient μ3 of the friction surfaces (sliding surfaces) between the lining plate 76 and the second friction material 112 is made larger than the friction coefficient μ2 of the friction surfaces (sliding surfaces) between the lining plate 76 and the first friction material 110.

As a result, the smallest friction coefficient is the friction coefficient μ1 of the friction surfaces (sliding surfaces) between the pressure plate 106 and the first friction material 110 and the friction coefficient μ1 of the friction surfaces (sliding surfaces) between the second support plate 104b and the second friction material 112, and the friction coefficient μ2 of the friction surfaces (sliding surfaces) between the lining plate 76 and the first friction material 110 is larger than the friction coefficient μ1 while the friction coefficient μ3 of the friction surfaces (sliding surfaces) between the lining plate 76 and the second friction material 112 is the largest (μ3>μ2>μ1). Therefore, the friction force F1 generated between the pressure plate 106 and the first friction material 110 and the friction force F1 generated between the second support plate 104b and the second friction material 112 are equal to each other and smaller than the friction force F2 generated between the lining plate 76 and the first friction material 110. The friction force F2 generated between the lining plate 76 and the first friction material 110 is smaller than a friction force F3 generated between the lining plate 76 and the second friction material 112 (F3>F2>F1).

A second stopper 122 (second stopper) is disposed between the second support plate 104b and the second friction material 112 to define a slip amount (relative rotation amount) between the second support plate 104b and the second friction material 112. The second stopper 122 is made up of a column-shaped projection 124 axially projecting from the friction surface of the second support plate 104b adjacent to the second friction material 112, and a perfectly circular stopper hole 126 formed in the second friction material 112. The projection 124 is housed in the stopper hole 126 to form a backlash L2 (gap) in the circumferential direction for defining the slip amount (relative rotation) between the second support plate 104b and the second friction material 112. The backlash L2 of the second stopper 122 is configured to be larger than the backlash L1 set in the first stopper 116. For example, as depicted in FIG. 6, the projections 118 and 124 are formed into a columnar shape while the stopper holes 120 and 126 are formed into a circular shape, and the diameter of the projection 124 is formed smaller than that of the projection 118 while the stopper hole 126 is formed larger than the stopper hole 120. With such a configuration, the slip amount defined by the first stopper 116 is made smaller than the slip amount defined by the second stopper 122.

Figure 7:
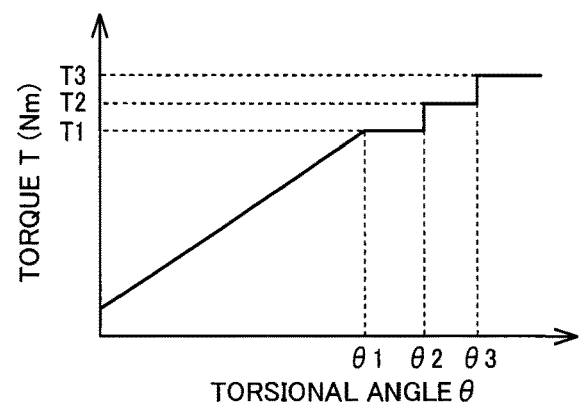
FIG. 7 is a diagram of relationship between a torque transmitted to the damper device of FIG. 6 and a torsional angle.

An operation of the damper device 100 configured as described above will be described. FIG. 7 depicts relationship between a torque T transmitted to the damper device 100 and a torsional angle θ. When the torque T is input to the damper device 100 and the torsional angle θ increases to a torsional angle θ1, a slip first occurs on the friction surfaces between the pressure plate 106 and the first friction material 110 and the friction surfaces between the second support plate 104b and the second friction material 112. This is because the lowest friction coefficient is the friction coefficient μ1 between the pressure plate 106 and the first friction material 110 and between the second support plate 104b and the second friction material 112. In this case, a hysteresis torque T1 represented by the following Equation (3) is generated. In Equation (3), r1 denotes an operation radius (rotation radius) of the first friction material 110 and W denotes the disc spring load of the disc spring 108.

$$T1 = r1 \times \mu1 \times W \qquad (3)$$

When the torsional angle θ reaches the torsional angle θ2, the projection 118 abuts on the stopper hole 120 in the first stopper 116, making the pressure plate 106 and the first friction material 110 relatively non-rotatable. A slip then occurs on the friction surfaces between the lining plate 76 and the first friction material 110. The slip continues on the friction surfaces between the second support plate 104b and the second friction material 112. In this case, a hysteresis torque T2 represented by the following Equation (4) is generated. In this equation, μ2 is the friction coefficient on the friction surfaces between the lining plate 76 and the first friction material 110. The friction coefficient μ2 is larger than the friction coefficient μ1 and, therefore, the hysteresis torque T2 is larger than the hysteresis torque T1.

$$T2 = r1 \times \mu 2 \times W \quad (4)$$

When the torsional angle θ further increases and reaches the torsional angle θ3, the projection 124 abuts on the stopper hole 126 in the second stopper 122, making the second support plate 104*b* and the second friction material 112 relatively non-rotatable. Therefore, the slip between the second support plate 104*b* and the second friction material 112 is regulated. A slip lastly occurs between the lining plate 76 and the second friction material 112. A torque T3 in this case is represented by the following Equation (5). In this equation, μ3 denotes the friction coefficient on the friction surfaces between the lining plate 76 and the second friction material 112. Since the friction coefficient μ3 is the largest based on Equation (5), the torque T3 becomes the largest. The torque T3 is the limiter torque Tlm of the torque limiter mechanism 102.

$$T3 = r1 \times \mu 3 \times W \quad (5)$$

As described above, the two-stage hysteresis torques T1, T2 are realized in the torque limiter mechanism 102. Since the torque limiter mechanism 102 is also used as the hysteresis mechanism, the torque limiter mechanism 102 is realized that can generate the hysteresis torque with a simple structure. Since the torque limiter mechanism 102 is disposed on the outer circumferential side of the disc plates 56, the first friction material 110 and the second friction material 112 have a larger radius (effective radius) r1. Therefore, since a wide range of hysteresis torque from small hysteresis torque to large hysteresis torque can be acquired by adjusting the friction coefficients μ1 to μ3 and the disc spring load of the disc spring 108, a degree of freedom of design is significantly improved. Four-stage hysteresis torques can be realized along with the hysteresis mechanism 64 generating conventional two-stage hysteresis torques.

As described above, according to this example, when the torque T is input to the damper device 100, a slip first occurs on the friction surfaces between the pressure plate 106 and the first friction material 110 and the friction surfaces between the second support plate 104*b* and the second friction material 112, and a first hysteresis torque T1 is generated at this point. When the first stopper 116 is locked, a slip occurs between the lining plate 76 and the first friction material 110 and a second hysteresis torque T2 is generated at this point. When the second stopper 122 is locked, the torque limiter mechanism 102 acts as a normal torque limiter based on the friction force generated between the lining plate 76 and the second friction material 112. In this way, the torque limiter mechanism 102 can be realized that enables acquisition of two-stage hysteresis torques.

Third Example

Figure 8:
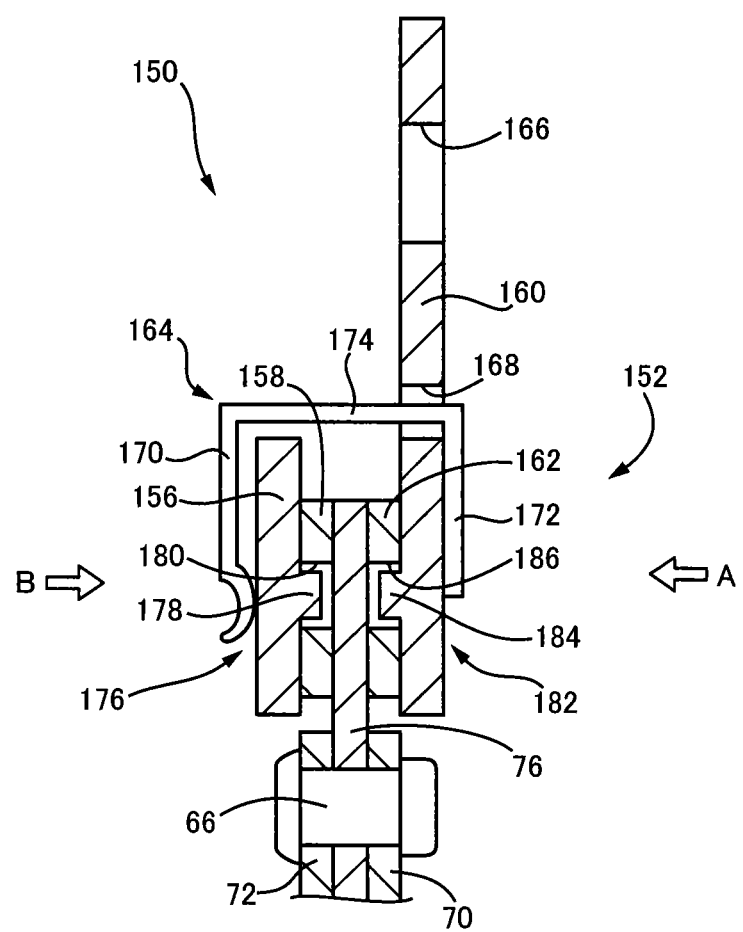
FIG. 8 is a cross-sectional view of a torque limiter mechanism of a damper device that is yet another example of the present invention.

FIG. 8 is a cross-sectional view of a torque limiter mechanism 152 (torque limiter device) of a damper device 150 that is yet another example of the present invention. The torque limiter mechanism 152 of this example is disposed as a plurality of mechanisms (at four locations in this example) at regular angular intervals in the circumferential direction rather than being entirely continuously disposed in the circumferential direction as in the examples. As depicted in FIG. 8, the torque limiter mechanism 152 includes the lining plate 76, a pressure plate 156, a first friction material 158 interposed between the lining plate 76 and the pressure plate 156, a support plate 160, a second friction material 162 interposed between the lining plate 76 and the support plate 160, and a clamping member 164 clamping the pressure plate 156 and the support plate 160 from the both ends in the axial direction. The torque limiter mechanism 152 corresponds to the vehicle torque limiter device of the present invention; the pressure plate 156 corresponds to the first cover plate of the present invention; the support plate 160 corresponds to the second cover plate of the present invention; the clamping member 164 corresponds to the pressing member of the present invention; the first friction material 158 corresponds to the first friction material of the present invention; and the second friction material 162 corresponds to the second friction material of the present invention.

The support plate 160 is formed into an annular plate shape and formed with a bolt hole 166 for bolt-fastening not depicted and a through-hole 168 for allowing the clamping member 164 to penetrate in the axial direction. The support plate 160 and the pressure plate 156 are configured to be rotatable around the axial center C and the lining plate 76 is relatively rotatable to the support plate 160 and the pressure plate 156 around the axial center C.

The friction surfaces between the first friction material 158 and the pressure plate 156 are configured to be slidable on (relatively rotatable to) each other and the friction surfaces between the first friction material 158 and the lining plate 76 are configured to be slidable on (relatively rotatable to) each other. The friction surfaces between the second friction material 162 and the support plate 160 are configured to be slidable on (relatively rotatable to) each other and the friction surfaces between the second friction material 162 and the lining plate 76 are configured to be slidable on (relatively rotatable to) each other.

The clamping member 164 (pressing member) is made of spring steel and includes a first abutting portion 170 having an inner circumferential end portion abutting on the pressure plate 156, a second abutting portion 172 abutting on the support plate 160, and a coupling portion 174 coupling outer circumferential end portions of the first abutting portion 170 and the second abutting portion 172 in the axial direction. The clamping member 167 axially clamps (presses) the pressure plate 156 and the support plate 160 with a preset preload (disc spring load W).

A first stopper 176 (first stopper) is disposed between the pressure plate 156 and the first friction material 158 to define (limit) a slip amount (relative rotation amount) between the pressure plate 156 and the first friction material 158. The first stopper 176 is made up of a column-shaped projection 178 axially projecting from the friction surface of the pressure plate 156 adjacent to the first friction material 158, and a stopper hole 180 formed in the first friction material 158. The projection 178 is housed in the stopper hole 180 to form a backlash L1 in the rotation direction for allowing a predetermined slip amount (relative rotation) between the pressure plate 156 and the first friction material 158.

A second stopper 182 (second stopper) is disposed between the support plate 160 and the second friction material 162 to define a slip amount (relative rotation amount) between the support plate 160 and the second friction material 162. The second stopper 182 is made up of a projection 184 axially projecting from the friction surface of the support plate 160 adjacent to the second friction material 162, and a stopper hole 186 formed in the second friction material 162. The projection 178 and the projection 184 are assumed to have the same shape (external diameter). The projection 184 is housed in the stopper hole 186 to form a backlash (gap) L2 for defining the slip amount (relative rotation amount) between the support plate 160 and the second friction material 162. The backlash L2 is formed larger than the backlash L1 of the first stopper 176.

Figure 9:
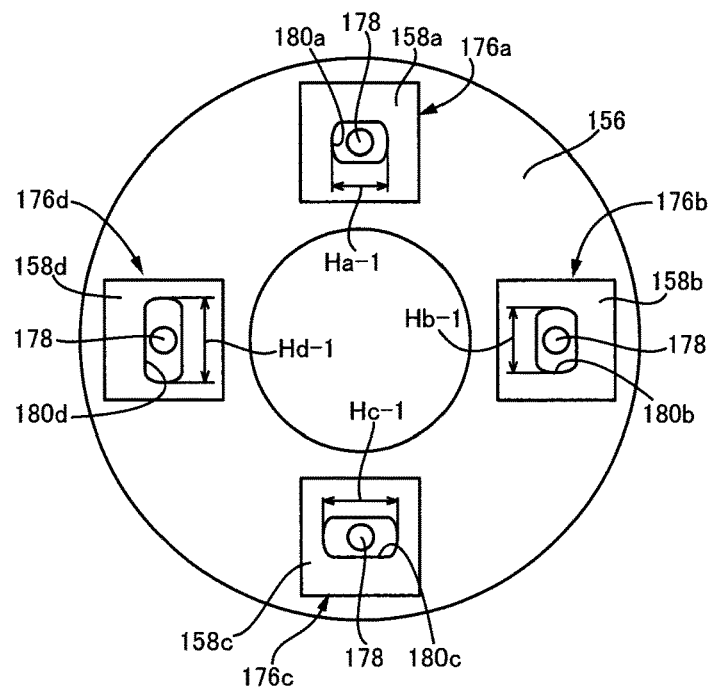
FIG. 9 is an A-arrow view of the pressure plate and the first friction material in the torque limiter mechanism of FIG. 8 viewed from arrow A of FIG. 8.

FIG. 9 is an A-arrow view of the pressure plate 156 and the first friction material 158 in the torque limiter mechanism 152 of FIG. 8 viewed from arrow A of FIG. 8. FIG. 9 is a simplified view and is not drawn in accurate scale etc.

As depicted in FIG. 9, the circular-plate-shaped pressure plate 156 has the four first friction materials 158 arranged separately at regular angular intervals in the circumferential direction. In FIG. 9, the first friction material 158 on the top is denoted by a reference numeral as a first friction material 158a, and the first friction materials 158 are denoted by respective reference numerals as a first friction material 158b to a first friction material 158d clockwise from the first friction material 158a. As depicted in FIG. 9, the first friction materials 158a to 158d are disposed with respective first stoppers 176a to 176d defining a slip amount between the pressure plate 156 and the first friction materials 158. The stopper holes 180 are denoted by reference numerals (180a to 180d) in the same way as the first friction materials 158. In this example, each of the disc spring loads W generated by the clamping members 164 is not changed.

Although the first stoppers 176 (176a to 176d) have the projections 178 of a common shape, the stopper holes 180 (180a to 180d) have circumferential widths different from each other. Specifically, as depicted in FIG. 9, a groove width Ha-1 of the stopper hole 180a is the smallest among the stopper holes 180; a groove width Hb-1 of the stopper hole 180b is formed larger than the groove width Ha-1 of the stopper hole 180a; a groove width Hc-1 of the stopper hole 180c is formed larger than the groove width Hb-1 of the stopper hole 180b; and a groove width Hd-1 of the stopper hole 180d is formed larger than the groove width Hc-1 of the stopper hole 180c.

Figure 10:
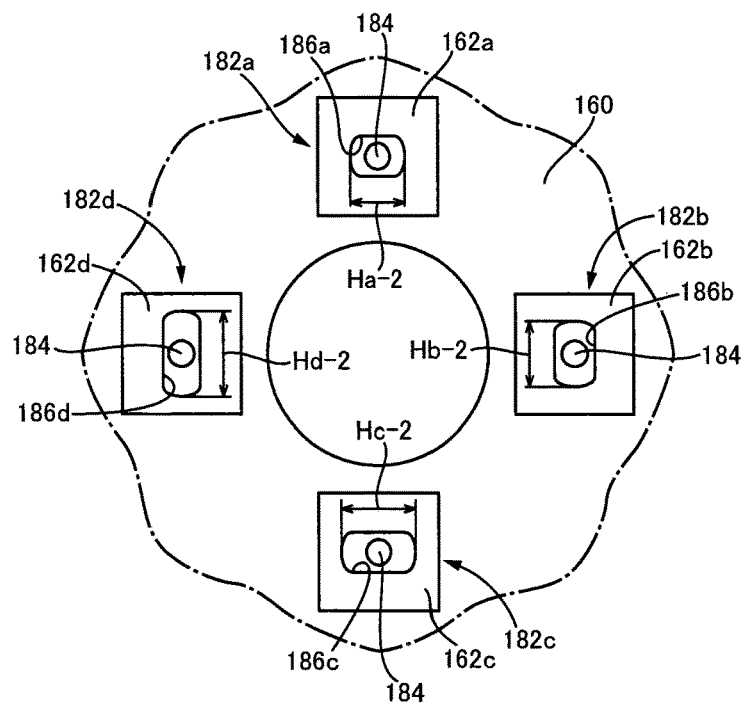
FIG. 10 is a B-arrow view of the support plate and the second friction material in the torque limiter mechanism of FIG. 8 viewed from arrow B of FIG. 8.

FIG. 10 is a B-arrow view of the support plate 160 and the second friction material 162 in the torque limiter mechanism 152 of FIG. 8 viewed from arrow B of FIG. 8. FIG. 10 is a simplified view and is not drawn in accurate scale etc., and the outer circumferential portion of the support plate 160 is not depicted.

As depicted in FIG. 10, the circular-plate-shaped support plate 160 has the four second friction materials 162 arranged separately at regular angular intervals in the circumferential direction. In FIG. 10, the second friction material 162 on the top is denoted by a reference numeral as a second friction material 162a, and the second friction materials 162 are denoted by respective reference numerals as a second friction material 162b to a second friction material 162d clockwise from the second friction material 162a. As depicted in FIG. 10, the second friction materials 162a to 162d are disposed with respective second stoppers 182a to 182d defining a slip amount between the support plate 160 and the second friction materials 162. The stopper holes 186 making up the second stoppers 182 are denoted by reference numerals (186a to 186d) in the same way as the second friction materials 162.

The projections 184 of the second stoppers 182a to 182d have a shape common with the projections 178 of the first stoppers 176. On the other hand, the stopper holes 186a to 186d have circumferential widths different from each other. Specifically, as depicted in FIG. 10, a groove width Ha-2 of the stopper hole 186a is the smallest among the stopper holes 186; a groove width Hb-2 of the stopper hole 186b is formed larger than the groove width Ha-2 of the stopper hole 186a; a groove width Hc-2 of the stopper hole 186c is formed larger than the groove width Hb-2 of the stopper hole 186b; and a groove width Hd-2 of the stopper hole 186d is formed larger than the groove width Hc-2 of the stopper hole 186c.

Comparing the groove widths (Ha-1 to Hd-1, Ha-2 to Hd-2) including the groove widths (Ha-1 to Hd-1) of the stopper holes 180 of the first stoppers 176, the groove widths are set to relationship represented by the following Equation (6). Since the projections 178 of the first stoppers 176 and the projections 184 of the second stoppers 182 have the same shape, Equation (6) corresponds to a size of the backlash L, i.e., a level of the slip amount (relative rotation amount) defined (allowed) by the stoppers 176 and 182.

$$Hd\text{-}2 > Hd\text{-}1 > Hc\text{-}2 > Hc\text{-}1 > Hb\text{-}2 > Hb\text{-}1 > Ha\text{-}2 > Ha\text{-}1 \qquad (6)$$

The friction coefficient µ of the friction surfaces between the pressure plate 156 and the first friction material 158a is set to µ1; the friction coefficient of the friction surfaces between the lining plate 76 and the first friction material 158a is set to µ2; the friction coefficient µ of the friction surfaces between the support plate 160 and the second friction material 162a is set to µ1; and the friction coefficient µ of the friction surfaces between the lining plate 76 and the second friction surface 162a is set to µ3. The friction coefficient µ of the friction surfaces between the pressure plate 156 and the first friction material 158b is set to µ1; the friction coefficient µ of the friction surfaces between the lining plate 76 and the first friction material 158b is set to µ4; the friction coefficient µ of the friction surfaces between the support plate 160 and the second friction material 162b is set to µ1; and the friction coefficient µ of the friction surfaces between the lining plate 76 and the second friction surface 162b is set to µ5. The friction coefficient µ of the friction surfaces between the pressure plate 156 and the first friction material 158c is set to µ1; the friction coefficient µ of the friction surfaces between the lining plate 76 and the first friction material 158c is set to µ6; the friction coefficient µ, of the friction surfaces between the support plate 160 and the second friction material 162c is set to µ1; and the friction coefficient µ of the friction surfaces between the lining plate 76 and the second friction surface 162c is set to µ7. The friction coefficient µ of the friction surfaces between the pressure plate 156 and the first friction material 158d is set to µ1; the friction coefficient µ of the friction surfaces between the lining plate 76 and the first friction material 158d is set to µ8; the friction coefficient µ of the friction surfaces between the support plate 160 and the second friction material 162d is set to µ1; and the friction coefficient µ of the friction surfaces between the lining plate 76 and the second friction surface 162d is set to µ9.

The friction coefficients µ1 to µ9 are set to relationship represented by the following Equation (7). In other words, equal and smallest values are set as a friction force F1 generated between the pressure plate 156 and the first friction material 158a, the friction force F1 generated between the support plate 160 and the second friction material 162a, the friction force F1 generated between the pressure plate 156 and the first friction material 158b, the friction force F1 generated between the support plate 160 and the second friction material 162b, the friction force F1 generated between the pressure plate 156 and the first friction material 158c, the friction force F1 generated between the support plate 160 and the second friction material 162c, the friction force F1 generated between the pressure plate 156 and the first friction material 158d, and the friction force F1 generated between the support plate 160 and the second friction material 162d. A friction force F2 generated between the lining plate 76 and the first friction material 158a is larger than the friction force F1. A friction force F3 generated between the lining plate 76 and the second friction surface 162a is larger than the friction force F2. A friction force F4 generated between the lining plate 76 and the first friction material 158b is larger than the friction force F3. A friction force F5 generated between the lining plate 76 and the second friction surface 162b is larger than the friction force F4. A friction force F6 generated between the lining plate 76 and the first friction material 158c is larger than the friction force F5. A friction force F7 generated between the lining plate 76 and the second friction surface 162c is larger than the friction force F6. A friction force F8 generated between the lining plate 76 and the first friction material 158d is larger than the friction force F7. A friction force F9 generated between the lining plate 76 and the second friction surface 162d is larger than the friction force F8. The relationship is represented by the following Equation (8).

$$\mu 9 > \mu 8 > \mu 7 > \mu 6 > \mu 5 > \mu 4 > \mu 3 > \mu 2 > \mu 1 \qquad (7)$$

$$F9 > F8 > F7 > F6 > F5 > F4 > F3 > F2 > F1 \qquad (8)$$

Based on Equations (7) and (6), for the friction materials having the friction surfaces with the larger friction coefficients μ set between the friction materials and the lining plate 76, the slip amounts defined by the first stoppers 176 and the second stoppers 182 are set larger.

An operation of the torque limiter mechanism 152 configured as described above will be described. FIG. 11 depicts relationship between a torque transmitted to the damper device 150 of this example and a torsional angle θ. When the torque T is input to the damper device 150, the torsional angle θ increases in proportion. When the torsional angle θ reaches θ1, a slip occurs on the friction surfaces having the friction coefficient μ of μ1 (the friction surfaces between the pressure plate 156 and the first friction materials 158a to 158d and the friction surfaces between the support plate 160 and the second friction materials 162a to 162d). In this case, a hysteresis torque T1 (=r1×μ1×W) is generated.

When the torsional angle θ reaches θ2, the projection 178 abuts on the stopper hole 180 in the first stopper 176a, regulating a slip between the pressure plate 156 and the first friction material 158a. A slip then occurs between the lining plate 76 and the first friction material 158a having the friction coefficient μ of μ2. The slip continues on the friction surfaces having the friction coefficient μ of μ1 other than the friction surfaces regulated by the first stopper 176a. In this case, a hysteresis torque T2 (=r1×μ2×W) is generated until the torsional angle θ reaches θ3.

When the torsional angle θ reaches θ3, the projection 184 abuts on the stopper hole 186a in the second stopper 182a, regulating a slip between the support plate 160 and the second friction material 162a. A slip then occurs on the friction surfaces between the lining plate 76 and the second friction surface 162a having the friction coefficient μ of μ3. The slip continues on the friction surfaces having the friction coefficient μ of μ1 other than the friction surfaces regulated by the first stopper 176a and the second stopper 182a and the friction surfaces having the friction coefficient μ of μ2. In this case, a hysteresis torque T3 (=r1×μ3×W) is generated until the torsional angle θ reaches θ4.

When the torsional angle θ reaches θ4, the projection 178 abuts on the stopper hole 180b in the first stopper 176b, regulating a slip between the pressure plate 156 and the first friction material 158b. A slip then occurs between the lining plate 76 and the first friction material 158b having the friction coefficient μ of μ4. The slip continues on the friction surfaces having the friction coefficient μ of μ1 other than the friction surfaces regulated by the first stoppers 176a, 176b, and the second stopper 182a and the friction surfaces having the friction coefficients μ of μ2 and μ3. In this case, a hysteresis torque T4 (=r1×μ4×W) is generated until the torsional angle θ reaches θ5.

When the torsional angle θ reaches θ5, the projection 184 abuts on the stopper hole 186b in the second stopper 182b, regulating a slip between the support plate 160 and the second friction material 162b. A slip then occurs between the lining plate 76 and the second friction material 162b having the friction coefficient μ of μ5. The slip continues on the friction surfaces having the friction coefficient μ of μ1 other than the friction surfaces regulated by the first stoppers 176a, 176b and the second stoppers 182a, 182b and the friction surfaces having the friction coefficients μ of μ2 to μ4. In this case, a hysteresis torque T5 (=r1×μ5×W) is generated until the torsional angle θ reaches θ6.

When the torsional angle θ reaches θ6, the projection 178 abuts on the stopper hole 180c in the first stopper 176c, regulating a slip between the pressure plate 156 and the first friction material 158c. A slip then occurs between the lining plate 76 and the first friction material 158c having the friction coefficient μ of μ6. The slip continues on the friction surfaces having the friction coefficient μ of μ1 other than the friction surfaces regulated by the first stoppers 176a to 176c and the second stoppers 182a, 182b and the friction surfaces having the friction coefficients μ of μ2 to μ5. In this case, a hysteresis torque T6 (=r1×μ6×W) is generated until the torsional angle θ reaches θ7.

When the torsional angle θ reaches θ7, the projection 184 abuts on the stopper hole 186c in the second stopper 182c, regulating a slip between the support plate 160 and the second friction material 162c. A slip then occurs between the lining plate 76 and the second friction material 162c having the friction coefficient μ of μ7. The slip continues on the friction surfaces having the friction coefficient μ of μ1 other than the friction surfaces regulated by the first stoppers 176a to 176c and the second stoppers 182a to 182c and the friction surfaces having the friction coefficients μ of μ2 to μ6. In this case, a hysteresis torque T7 (=r1×μ7×w) is generated until the torsional angle θ reaches θ8.

When the torsional angle θ reaches θ8, the projection 178 abuts on the stopper hole 180d in the first stopper 176d, regulating a slip between the pressure plate 156 and the first friction material 158d. A slip then occurs between the lining plate 76 and the first friction material 158d having the friction coefficient μ of μ8. The slip continues on the friction surfaces having the friction coefficient μ of μ1 other than the friction surfaces regulated by the first stoppers 176a to 176d and the second stoppers 182a to 182c and the friction surfaces having the friction coefficients μ of ρ2 to μ7. In this case, a hysteresis torque T8 (=r1×μ8×W) is generated until the torsional angle θ reaches θ9.

When the torsional angle θ reaches θ9, the projection 184 abuts on the stopper hole 186d in the second stopper 182d, regulating a slip between the support plate 160 and the second friction material 162d. A slip then occurs between the lining plate 76 and the second friction material 162d having the friction coefficient μ of μ9. The slip continues on the friction surfaces having the friction coefficients μ of μ2 to μ8. In this case, a torque T9 (=r1×μ9×W) is generated and the torque T9 is the limit torque Tlm of this example.

As described above, by circumferentially arranging pluralities of the first friction materials 158 and the second friction materials 162 (158a to 158d, 162a to 162d), the hysteresis torques T1 to T8 can be acquired in multiple stages.

As described above, according to this example, by differentiating the friction coefficients μ1 to μ9 from each other on the friction surfaces of a plurality of the first friction materials 158a to 158d and a plurality of the second friction materials 162a to 162d and the lining plate 76, the torque limiter mechanism 152 can be implemented that enables acquisition of multistage hysteresis torque with a simple structure.

Fourth Example

Figure 14:
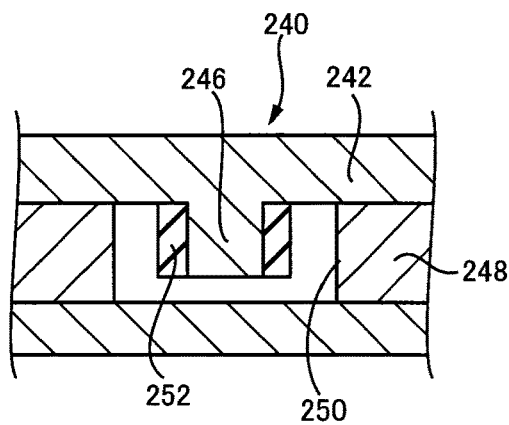
FIG. 14 is a diagram of further other form of stoppers.

FIGS. 12 to 14 depict other forms of the projections and the stopper holes making up the stopper 90, first stoppers 116, 176, and second stoppers 122, 182 of the examples described above. A stopper 200 of FIG. 12 is made up of a column-shaped projection 204 formed on a pressure plate 202 and a bottomed-cylinder-shaped stopper hole 208 formed in a friction material 206, for example. A reinforcing member 210 consisting of bottomed-cylinder-shaped metal is embedded in a wall surface of the stopper hole 208 in a fitting manner. As a result, the projection 204 abuts on the reinforcing member 210 rather than directly abutting on a friction material resin making up the friction material 206. Therefore, deterioration in durability and damage are prevented from occurring due to direct abutting on the projection 204 to the friction material resin. The shape of the reinforcing member 210 may be changed as needed depending on the shape of the stopper hole 208.

A stopper 220 of FIG. 13 is made up of a column-shaped projection 224 formed on a pressure plate 222 and a cylindrical stopper hole 228 formed in a friction material 226. The friction material 226 of this example has a structure formed by attaching a first friction material 232 and a second friction material 234 to an arc-shaped metal plate 230. A circumferential end portion of the metal plate 230 projects into the stopper hole 228. When the stopper 220 is formed in this way, the projection 224 abuts on the circumferential end portion of the metal plate 230 without abutting the friction material resin. Therefore, deterioration in durability and damage are prevented from occurring due to direct abutting on the projection 224 to the friction material resin.

Figure 15:
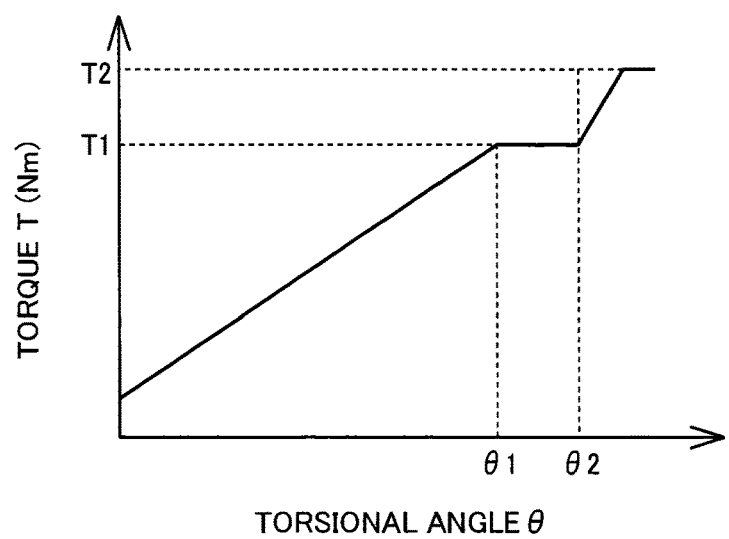
FIG. 15 is a diagram of relationship between a torque and a torsional angle when the stopper of FIG. 14 is used.

A stopper 240 of FIG. 14 is made up of a column-shaped projection 246 formed on a pressure plate 242 and a cylindrical stopper hole 250 formed in a friction material 248. A cylindrical rubber member 252 is fitted to an outer circumferential surface of the projection 246. When the stopper 240 is configured in this way, the projection 246 does not directly contact the friction material resin of the friction material 248 and a shock at the time of contact is alleviated. As depicted in FIG. 15, when the projection 246 contacts the rubber member 252 at the torsional angle θ2, torsional characteristics are changed by the rubber member 252 and a change from the hysteresis torque T1 to the limiter torque T2 is gradually made along with an increase in the torsional angle θ. Therefore, a sharp change is prevented when the hysteresis torque T1 is switched to the limiter torque T2. The shape of the rubber member 252 may be changed as needed depending on the shape of the projection 246.

Although the cylindrical rubber member 252 is fitted to the projection 246 in FIG. 14, a spring member may be interposed between the projection 246 and the friction material 248. If the spring members are disposed on the both ends in the circumferential direction, a function of automatically centering the hysteresis mechanism is added.

Although the examples of the present invention have been described in detail with reference to the drawings, the present invention is applied in other forms.

For example, although all the projections have a columnar shape in the examples, this is not a limitation and the projection may have a square shape etc. The stopper hole may freely be changed depending on a shape of the projection. In other words, the shapes of the projection and the stopper hole may freely be changed as long as the stopper is configured to define a circumferential slip.

Although the torque limiter mechanism 152 realizes eight-stage hysteresis torques, a change can freely be made by changing the numbers of friction materials etc., arranged in the circumferential direction.

Although the hysteresis mechanism 64 is disposed on the damper device in the examples, the hysteresis torque can be generated in the torque limiter mechanism 68 and, therefore, the hysteresis mechanism can be omitted.

Although a plurality of the first friction materials 158 and a plurality of the second friction materials 162 are used in the torque limiter mechanism 152 in the examples, the torque limiter mechanism 152 may be configured such that only the first friction materials 158 are disposed with the first stoppers 176 or that only the second friction materials 162 are disposed with the second stoppers 182.

In the examples, the first friction materials and the second friction materials may be interposed at positions with left and right reversed.

The above description is merely an embodiment and the present invention may be implemented in variously modified and improved forms based on the knowledge of those skilled in the art.

NOMENCLATURE OF ELEMENTS 68, 102, 152: torque limiter mechanism (vehicle torque limiter device)
76: lining plate
78b, 104b: second support plate (second cover plate)
80, 106, 156: pressure plate (cover plate, first cover plate)
82, 108: disc spring (pressing member)
88: first friction material (friction material)
90, 200, 220, 240: stopper
110, 158: first friction material (first friction material)
112, 162: second friction material (second friction material)
116, 176: first stopper (first stopper)
122, 182: second stopper (second stopper)
160: support plate (second cover plate)
164: clamping member (pressing member)

The invention claimed is:

1. A vehicle torque limiter device comprising:
a cover plate rotatable around an axial center; a lining plate relatively rotatable to the cover plate around the same axial center;
a friction material interposed between the cover plate and the lining plate; and
a pressing member for generating a pressing force between the cover plate and the lining plate,
the cover plate and the friction material being configured to be slidable on each other,
the lining plate and the friction material being configured to be slidable on each other,
a friction force generated on friction surfaces between the cover plate and the friction material being smaller than a friction force generated on friction surfaces between the lining plate and the friction material, a stopper being disposed between the cover plate and the friction material, the stopper defining a slip amount between the cover plate and the friction material, the cover plate including a pair of a first cover plate and a second cover plate, a first friction material being interposed as the friction material between the first cover plate and the lining plate, a second friction material being also interposed as the friction material between the second cover plate and the lining plate, a first stopper being disposed as the stopper between the first cover plate and the first friction material, a second stopper being disposed as the stopper between the second cover plate and the second friction material, a slip amount defined by the first stopper being smaller than a slip amount defined by the second stopper, a friction force generated on friction surfaces between the first cover plate and the first friction material and a friction force generated on friction surfaces between the second cover plate and the second friction material being smaller than a friction force generated on friction surfaces between the lining plate and the first friction material, and a friction force generated on friction surfaces between the lining plate and the first friction material being smaller than a friction force generated on friction surfaces between the lining plate and the second friction material.

2. The vehicle torque limiter device of claim 1, comprising
a plurality of the first friction materials arranged separately in a circumferential direction,
a plurality of the first stoppers defining a slip amount between a plurality of the first friction materials and the first cover plate,
a plurality of the second friction materials arranged separately in a circumferential direction, and
a plurality of the second stoppers defining a slip amount between a plurality of the second friction materials and the second cover plate, wherein
a friction coefficient between the plurality of the first friction materials and the lining plate is different from a friction coefficient between the plurality of the second friction materials and the lining plate each other, and wherein
for the friction material having the friction surface with the larger friction coefficient between the friction material and the lining plate, the slip amount defined by the first stopper or the second stopper is set larger.

3. A vehicle torque limiter device comprising:
a cover plate rotatable around an axial center; a lining plate relatively rotatable to the cover plate around the same axial center;
a friction material interposed between the cover plate and the lining plate; and a pressing member for generating a pressing force between the cover plate and the lining plate,
the cover plate and the friction material being configured to be slidable on each other,
the lining plate and the friction material being configured to be slidable on each other,
friction surfaces between the cover plate and the friction material slipping earlier than friction surfaces between the lining plate and the friction material when a torque is input to the torque limiter portion,
a stopper being disposed between the cover plate and the friction material, the stopper defining a slip amount between the cover plate and the friction material,
the cover plate including a pair of a first cover plate and a second cover plate,
a first friction material being interposed as the friction material between the first cover plate and the lining plate,
a second friction material being also interposed as the friction material between the second cover plate and the lining plate,
a first stopper being disposed as the stopper between the first cover plate and the first friction material,
a second stopper being disposed as the stopper between the second cover plate and the second friction material,
a slip amount defined by the first stopper being smaller than a slip amount defined by the second stopper, and
when a torque is input to the torque limiter portion, a slip first occurring on friction surfaces between the first cover plate and the first friction material and friction surfaces between the second cover plate and the second friction material, then occurring on friction surfaces between the lining plate and the first friction material, and lastly occurring on friction surfaces between the lining plate and the second friction material.

4. The vehicle torque limiter device of claim 3, comprising
a plurality of the first friction materials arranged separately in a circumferential direction,
a plurality of the first stoppers defining a slip amount between a plurality of the first friction materials and the first cover plate,
a plurality of the second friction materials arranged separately in a circumferential direction, and
a plurality of the second stoppers defining a slip amount between a plurality of the second friction materials and the second cover plate, wherein
a friction coefficient between the plurality of the first friction materials and the lining plate is different from a friction coefficient between the plurality of the second friction materials and the lining plate each other, and wherein
for the friction material having the friction surface with the larger friction coefficient between the friction material and the lining plate, the slip amount defined by the first stopper or the second stopper is set larger.

\* \* \* \* \*